(No Model.)

J. T. HUNER.
Butter Cutter.

No. 241,864.  Patented May 24, 1881.

Witnesses:
W. B. Masson.
E. E. Masson

Inventor:
John T. Huner
T. C. Woodward
atty

UNITED STATES PATENT OFFICE.

JOHN T. HUNER, OF NEW YORK, N. Y.

BUTTER-CUTTER.

SPECIFICATION forming part of Letters Patent No. 241,864, dated May 24, 1881.

Application filed December 1, 1880. (No model.)

*To all whom it may concern:*

Be it known that I, JOHN T. HUNER, a resident of New York, in the county of New York, in the State of New York, have invented a new, useful, and important Improvement in Machines for Cutting and Weighing Butter, described in this specification.

In cutting and weighing butter and the like, as ordinarily done, much time is frequently lost in getting the amount required, and the lump is then usually in unshapely form.

To overcome these objections is the object of my invention; and it consists in a slotted graduated cylinder or case having a cutting edge, and a cutter across the end of the cylinder or case, and a plunger limited in its backward movement by an index on the plunger-handle, and notches leading from the slot in the cylinder or case.

Figure 1:
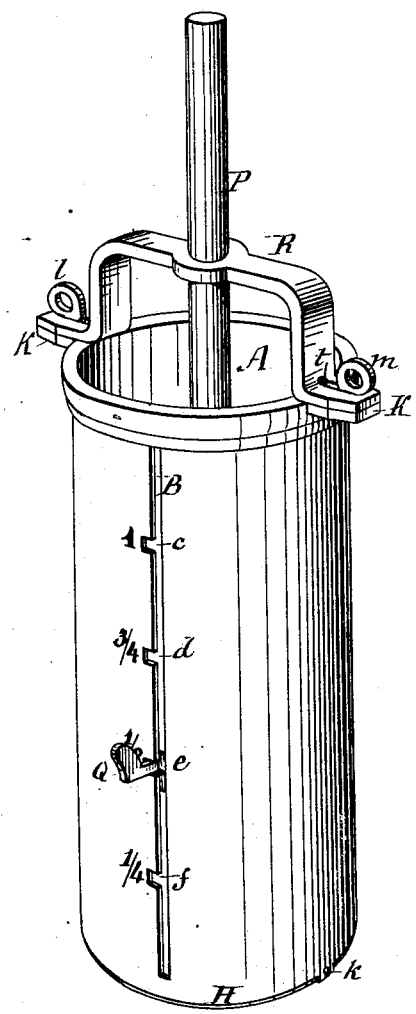
Figure 2:
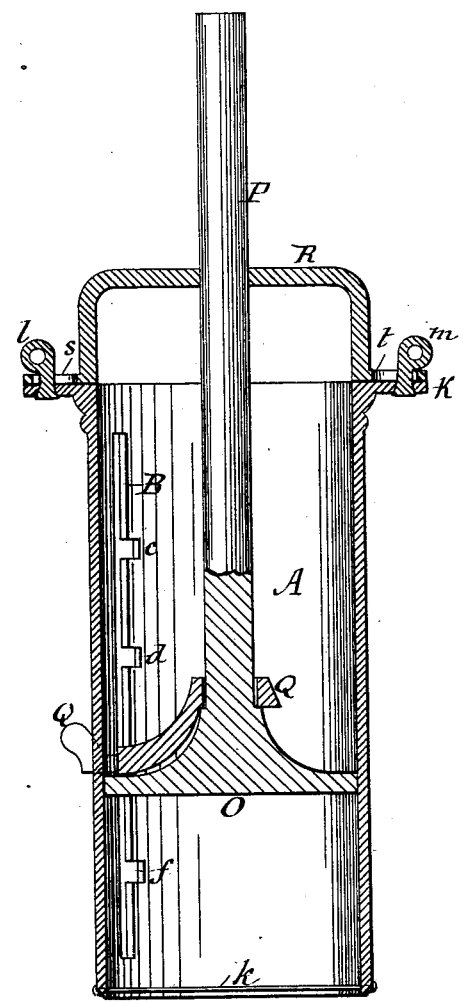

Figure 1 is a perspective view of one form of the invention, inclined to show its parts. Fig. 2 is a vertical sectional view of the same.

In the form of construction shown, the plunger O moves in the cylinder A, the handle P of the plunger passes through the support R, which is held to the flange K of the cylinder by slots $s\ t$ and turn-catches $l\ m$. The index Q is loose and moves on the handle P and in the slot B of the cylinder, and can be set in any one of the notches $c\ d\ e\ f$ thereof, which correspond with the scale of weights 1, ¾, ½, ¼, marked on the cylinder opposite the notches, to indicate that the cylinder below the notches and in front of the plunger will hold corresponding weights of butter. For example, were the index Q placed in notch $c$ and the plunger drawn back against the index and the cylinder forced into a mass or can of butter, the cutting-edge H would easily cut the butter, and the cylinder would be filled up to the plunger. Then, by turning the cylinder, the cutter $k$ would cut the butter in the cylinder from the mass, and the cylinder and its contents could be withdrawn, and the contents, one pound of butter, as indicated by the scale 1 opposite notch $c$, could be deposited on a plate or otherwise by pushing the plunger forward and pushing the butter from the cylinder or case. The cutter $k$ divides the lump as it enters the cylinder into two equal and convenient parts. It also serves to clean off the plunger by turning the plunger against it. The index being about in line with the face of the plunger, not only indicates the weight desired, but also indicates when the cylinder is pushed far enough into the butter to obtain the weight indicated—a great advantage in use.

The details of construction and operation may be varied within the scope of my invention, and other substance than butter—as dough—may be cut and weighed by the machine.

I claim as my invention—

1. The combination of cylinder A, having slot B, notches $c\ d\ e\ f$, cutting-edge H, and cutter $k$, with plunger O, having handle P, index Q loose thereon, and removable support R, substantially as set forth.

2. The combination of a cylinder having a scale, a cutting-edge, and a cutter across the cutting-edge, with a plunger, and an index loose on the plunger, substantially as set forth.

In testimony whereof I hereunto subscribe my signature, in the presence of two attesting witnesses, on the 30th day of November, 1880.

JOHN T. HUNER.

Witnesses:
T. W. KIMBELL,
GEORGE LIGHTOWLER.